United States Patent [19]

Nakama et al.

[11] Patent Number: 4,945,504

[45] Date of Patent: Jul. 31, 1990

[54] INSTRUCTION INPUT SYSTEM FOR ELECTRONIC PROCESSOR

[75] Inventors: Masato Nakama; Norihiro Hidaka, both of Tokyo, Japan

[73] Assignee: Casio Computer Co., Ltd., Tokyo, Japan

[21] Appl. No.: 40,489

[22] Filed: Apr. 20, 1987

[30] Foreign Application Priority Data

Apr. 30, 1986 [JP] Japan .................................. 61-97843

[51] Int. Cl.⁵ .............................................. G06F 1/00
[52] U.S. Cl. ................................ 364/709.11; 364/521
[58] Field of Search ............ 364/709.10, 900 MS File, 364/521, 523, 518, 200 MS File, 709.01, 709.02, 709.11

[56] References Cited

U.S. PATENT DOCUMENTS

| | | | |
|---|---|---|---|
| 4,430,526 | 2/1984 | Brown et al. | 178/18 |
| 4,435,777 | 3/1984 | McCaskill et al. | 364/900 |
| 4,559,598 | 12/1985 | Goldwasser et al. | 364/900 |
| 4,570,217 | 2/1986 | Allen et al. | 364/900 |

FOREIGN PATENT DOCUMENTS 60-46465 3/1985 Japan .
60-195632 10/1985 Japan .
2156114A 3/1984 United Kingdom .

OTHER PUBLICATIONS

Patent Abstracts, vol. 7, No. 152 (P-208)[1297], Jul. 5, 1983; & JP-A-58 64 536(Nippon Denshin Denwa Kosha) 16-04-1983.

*Primary Examiner*—Gary V. Harkcom
*Assistant Examiner*—Long T. Nguyen
*Attorney, Agent, or Firm*—Frishauf, Holtz, Goodman & Woodward

[57] ABSTRACT

An instruction input system for an electronic processor is capable of determining the type of an instruction and an area in which the instruction is to be executed simultaneously, in accordance with a set of touch-operation positions input via an input device having a touch-operation surface (coordinate input surface), thereby significantly improving the operability, input speed, and the like of the processor, and also improving the user interface.

15 Claims, 11 Drawing Sheets

EXAMPLE OF INSERT INSTRUCTION INPUT

EXAMPLE OF DELETE INSTRUCTION INPUT

EXAMPLE OF FRAME INSTRUCTION INPUT

F I G. 10
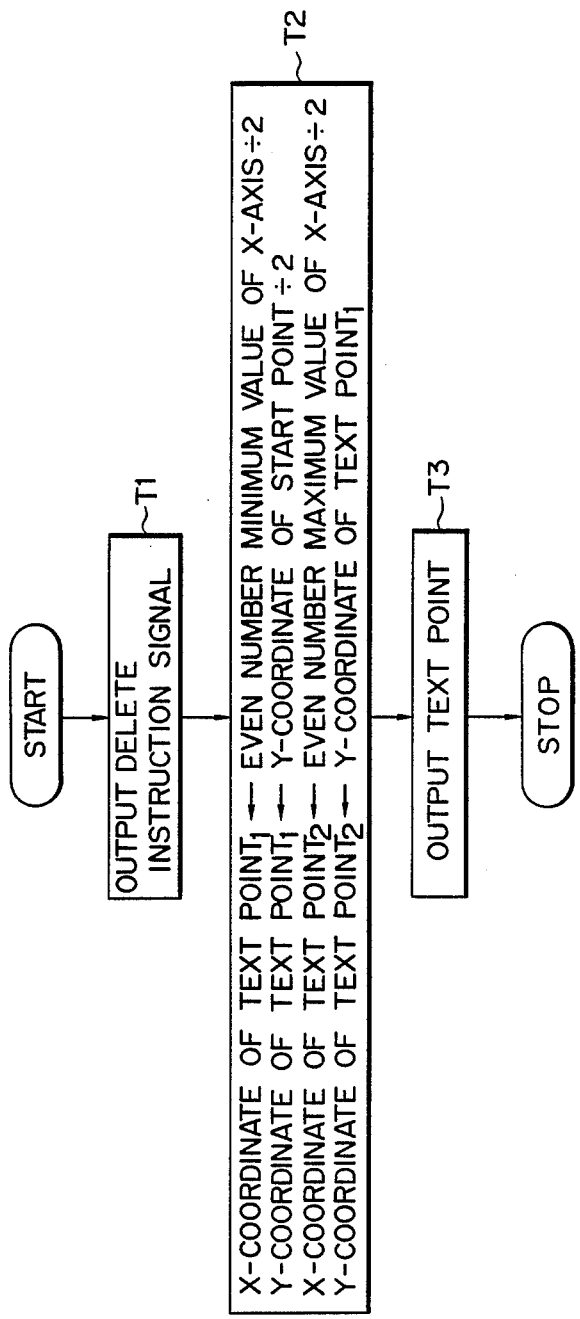

INSTRUCTION INPUT SYSTEM FOR ELECTRONIC PROCESSOR

BACKGROUND OF THE INVENTION

The present invention relates to an instruction input system for an electronic processor and, more particularly, to an instruction input system for a processor in which interactive communication is performed between a user and a computer. The present invention can be applied to a processor having a text processing function (such as a wordprocessor and a personal computer) and to an electronic processor having a graphic processing function.

Various conventional instruction input systems capable of performing interactive communication between a user and a computer are known. For example, as a medium or a port which enables communication between the user and the computer, keyboards, CRTs, plasma displays, and the like are widely used.

A problem of the user interface has been a major problem for a number of years, and hence has been investigated and developed with unceasing efforts, with the result that many effective user interfaces have been introduced. However, a versatile user interface has yet to be developed, so that further efforts will be required in this regard.

One of the various user interface problems is how a user or an operator can easily input necessary information and instructions, especially complex ones, to a computer, i.e., a problem of operability.

Conventional techniques have not yet found a satisfactory solution to this problem.

A wordprocessor will be exemplified to explain the above problem in greater detail. When a wordprocessor is used to perform edit processing (such as delete, insert, replace, and frame operations in conjunction with a text), unless a user specifies the type of instruction and the precise area where the designated instruction is to be executed, the wordprocessor cannot select the necessary processing and hence cannot execute processing, with the result that the user's request cannot be satisfied.

For this reason, in conventional wordprocessors, personal computers, and the like, as disclosed in U.S. Pat. No. 4,435,777 issued Mar. 6, 1984, in order to transmit all the information required for performing specific edit processing to a CPU such as a wordprocessor, a user transmits (inputs) to the computer two types of information, i.e., information designating a place or an area in which an instruction is to be executed, and information as to the type of instruction which is to be executed in a designated place. Typically, information specifying the area in which an instruction is to be executed is designated by moving a screen cursor on a display, by means of a moving device such as a key cursor on a keyboard or a pointing cursor of a mouse or a track ball. On the other hand, information as to the type of instruction which is to be executed is designated by selecting an edit instruction key and the like (e.g., a delete key and an insert key) on the keyboard or on an icon (tradename). Such a system is disclosed in Japanese Patent Disclosure (Kokai) No. 60-195632.

However, information specifying a place or an area in which an instruction is to be executed and information as to the type of an instruction must be input independently, resulting in a cumbersome operation for a user and a low input speed.

SUMMARY OF THE INVENTION

It is therefore an object of the present invention to provide an instruction input system for an electronic processor, which has high operability.

It is another object of the present invention to provide an instruction input system for an electronic processor, which has a good user interface.

It is yet another object of the present invention to provide an instruction input system for an electronic processor, which permits a high input speed.

In order to achieve the above objects, an instruction input system is provided for an electronic processor according to the present invention, comprising an input means having a touch-operation surface, and an instruction-analyzing means for determining by a set of operation positions with respect to the touch operation surface, the type of an instruction and an area in which an instruction is to be executed.

In the instruction input system for an electronic processor having the above arrangement according to the present invention, since the type of the instruction and the area in which the instruction is to be executed are determined by a set of operation positions on the touch-operation surface, a user interface can be significantly improved. More particularly, complex processing such as editing and proofreading can be input in the form of an instruction which can be executed by means of a very simple operation. In addition, the data input speed can be greatly increased.

BRIEF DESCRIPTION OF THE DRAWINGS

Other objects, features, and advantages of the present invention will become apparent from the following description, taken in conjunction with the accompanying drawings, in which:

FIG. 10 is a flow chart for explaining delete-instruction issue, as yet another operation of the present invention.

DETAILED DESCRIPTION OF THE PREFERRED EMBODIMENT

An embodiment in which the present invention is applied to a wordprocessor will now be described.

In this embodiment, in order to effect an edit function of a wordprocessor, symbols such as proofreader's symbols of a text are input as edit instruction inputs. Marks are input from a transparent touch operation surface overlapping a text output screen.

Figure 1A:
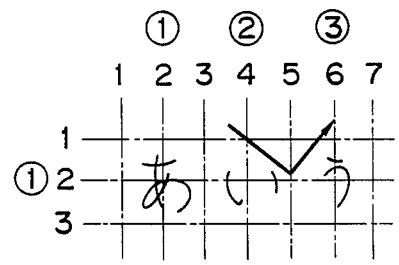
FIGS. 1A, 1B, and 1C are views respectively showing examples of symbol formats for instruction inputs.
Figure 1B:
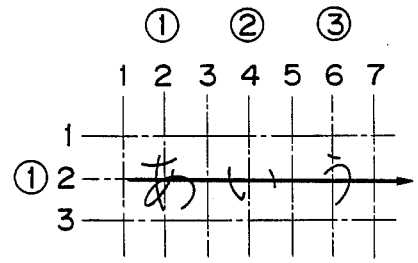
Figure 1C:
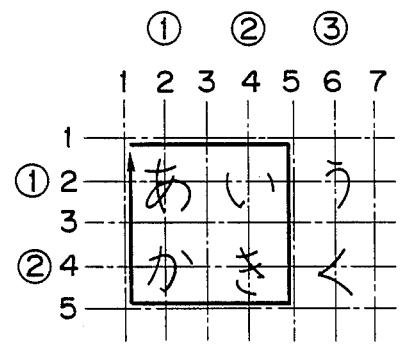

FIGS. 1A to 1C show input examples of proofreader's symbols, in which FIG. 1A shows an input example of an insert instruction symbol, FIG. 1B shows an input example of a delete instruction symbol, and FIG. 1C shows an input example of a frame instruction symbol. For example, when symbol "⌣" as shown in FIG. 1A is input, it is decoded as "insert into text point (3,1)" by an instruction analyzer. In this case, the type of instruction "insert" and an area or a position "text point (3,1)" in which the instruction is to be executed can be simultaneously identified.

The input symbols "⌣" shown in FIG. 1A schematically represents the locus of the finger tip moving on the touch-operation surface. In fact, this symbol is a combination of lines as thick as the finger tip. The same holds true of the symbols shown in FIGS. 1B and 1C.

As is apparent from this example, according to the embodiment, a user need only input a symbol for an edit instruction, so that a user interface is significantly improved.

In addition, in this embodiment, assume that a processor, i.e., a wordprocessor in this case controls positions with respect to the respective characters of a text displayed on an output screen (e.g., the processor controls character positions by a reference position in the upper left of the output screen, i.e., relative X-coordinate and Y-coordinate from origin (0,0)) at each intersection or each matrix element (e.g., in the case of a text memory, a memory cell at a predetermined row number and a predetermined column number) on a mesh defined by a plurality of straight lines parallel to a row direction, i.e., the X direction and a plurality of straight lines parallel to the Y direction, i.e., a column direction (e.g., a mesh constituted by each character row and each character column on a display memory, or a page of each character row and each character column on the text memory). Such a position control function is a standard function for conventional wordprocessors.

On the contrary, operation position signals with respect to the touch operation surface, which are input by an input processor having the touch operation surface, are finally detected or identified as intersections on a mesh (to be referred to as an input mesh hereinafter) defined by a plurality of straight lines parallel to the X direction and a plurality of straight lines parallel to the Y direction.

Therefore, an instruction analyzing means analyzes the type of instruction and an area in which the instruction is to be executed in accordance with a pattern formed by a set of intersections on the input mesh. Then, the instruction analyzing means identifies the instruction execution area, defined by intersections or intersection groups on the input mesh, with positions or position groups on the mesh provided on the text memory or the text display memory of the wordprocessor.

As described above, in this embodiment, since the input mesh similar to the mesh of the wordprocessor is used, mesh conversion or scale conversion need only be performed to obtain an area in which an instruction is to be executed by the wordprocessor. Therefore, a quantity of processing and a memory capacity including the area for programs required for the above operation are very small, thereby greatly improving a user interface or response.

Figure 2:
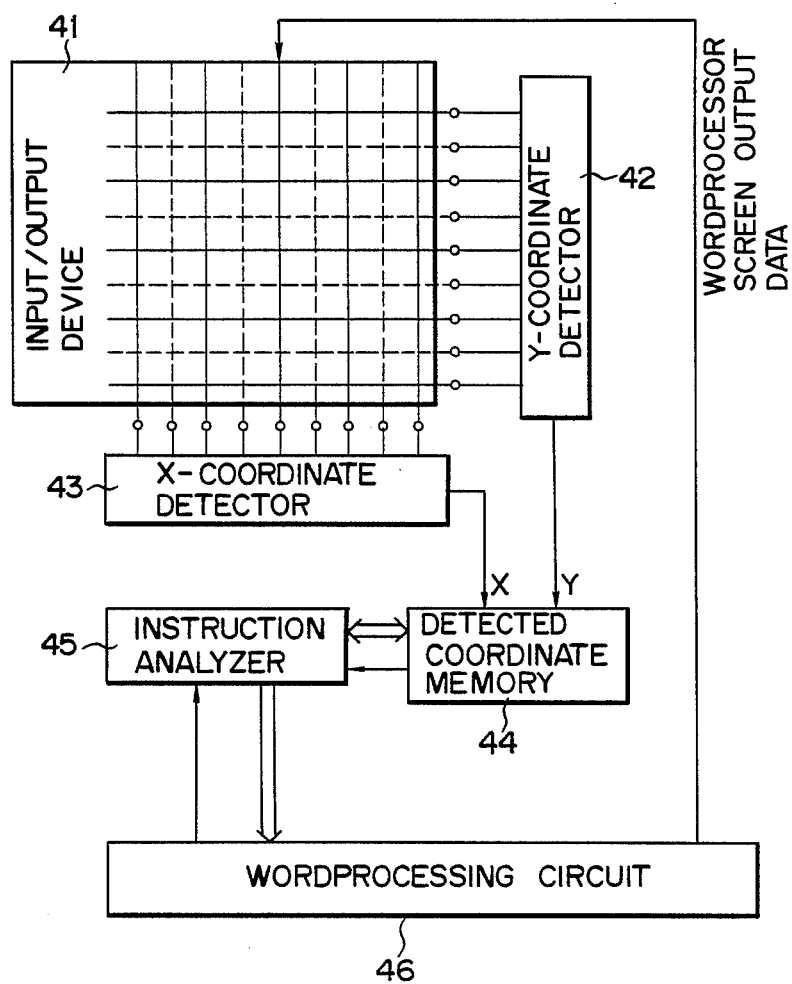
FIG. 2 is a block diagram showing an overall arrangement of an electronic processor used in an embodiment of the present invention.

FIG. 2 shows an overall arrangement of an electronic processor for explaining an embodiment of the present invention.

Reference numeral 41 denotes an input/output device for inputting proofreader's symbols and for displaying outputs of characters from wordprocessing circuit 46. For example, device 41 is arranged by a combination of a display such as a CRT or an LCD, a touch input device obtained by overlapping a transparent touch panel on a screen of the display, and a coordinate input device.

Reference numerals 42 and 43 denote circuits for detecting operation positions or input coordinates with respect to the touch operation surface. A Y-coordinate is detected by Y-coordinate detector 42, and an X-coordinate is detected by X-coordinate detector 43.

As a touch operation surface as a coordinate input panel and a circuit for detecting an input point, a panel of any conventional type such as a digital detecting type, an analog detecting type, a matrix resistance/conductor type, a voltage divider type, a strain gage type, an optical type, a capacitive type, and a surface wave type, may be used. More specifically, a panel of any type may be used if only input positions with respect to the touch operation surface (which need not be a physical panel) can be detected.

Coordinate data detected by detectors 42 and 43 are stored in detected coordinate memory 44.

Stored coordinate data or data of formation of a combination of points are analyzed by instruction analyzer 45 and the type of instruction and an area in which the instruction is to be executed are identified.

An analysis result is supplied to circuit 46 and an actual text edit processing is performed. Note that circuit 46 may be constituted by a conventional wordprocessor. An arrangement of the wordprocessor itself is not a primary concern of the present invention, and a description thereof will be omitted.

Figure 3:
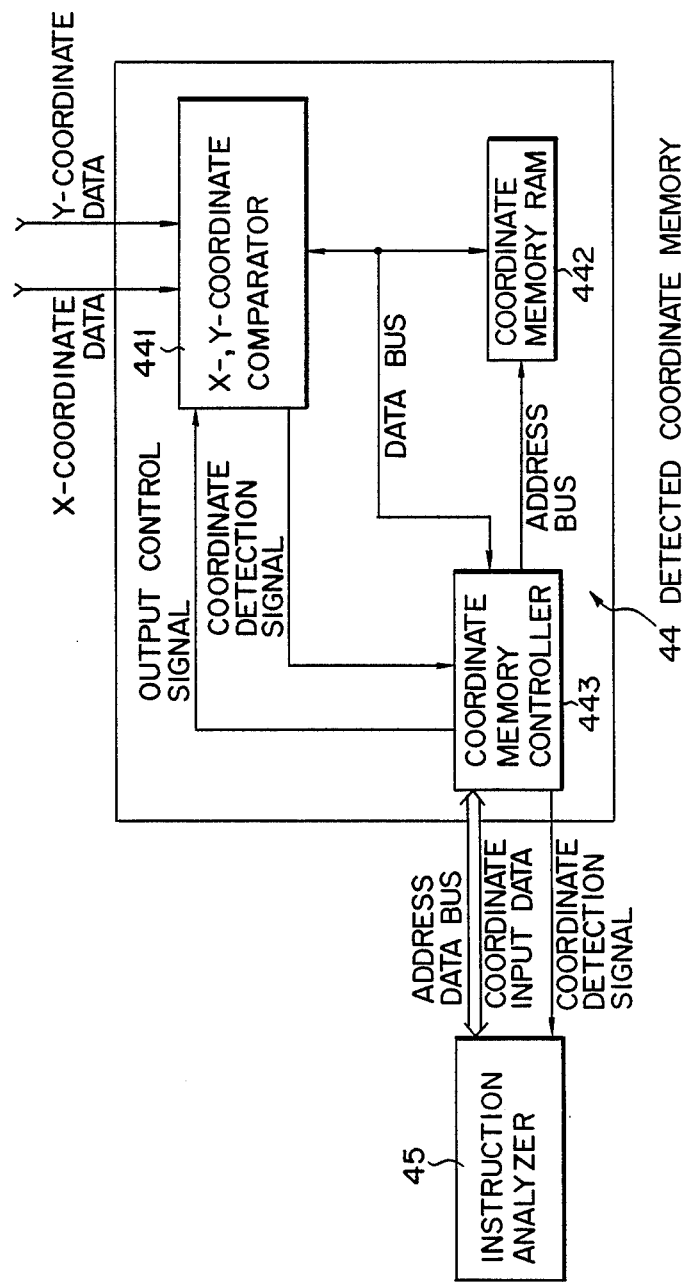
FIG. 3 is a block diagram showing an arrangement of detected coordinate memory 44 shown in FIG. 2.
Figure 4:
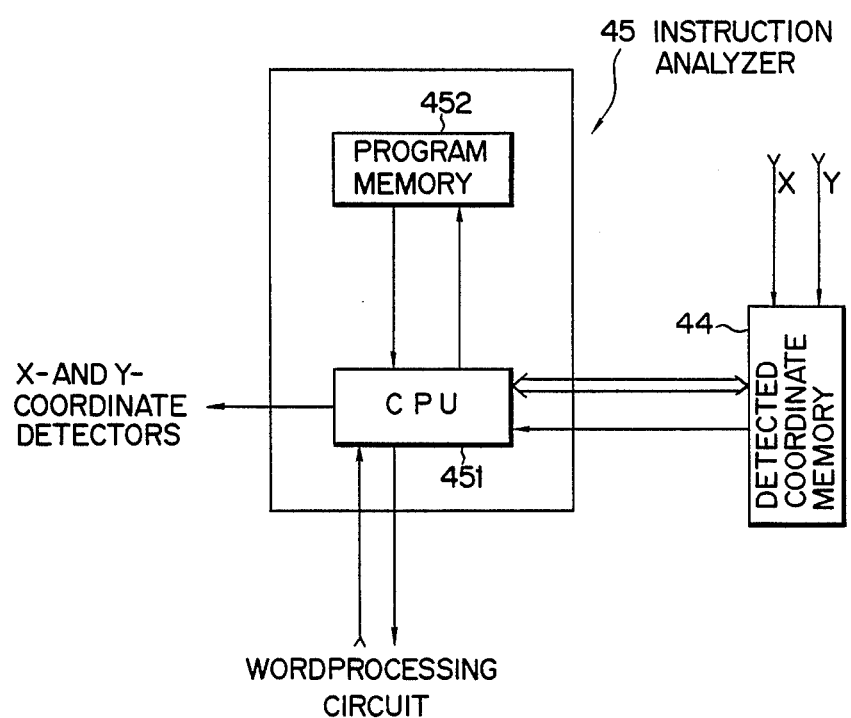
FIG. 4 is a block diagram showing an arrangement of instruction analyzer 45 shown in FIG. 2.

DETECTED COORDINATE MEMORY, INSTRUCTION ANALYZER (FIGS. 3 and 4)

FIG. 3 shows an internal arrangement of detected coordinate memory 44, and FIG. 4 shows an internal arrangement of instruction analyzer 45.

X-,Y-coordinate comparator 441 prevents inputs of the same coordinates. When coordinate data different from previous coordinate data is detected, comparator 441 supplies a coordinate detection signal to coordinate memory controller 443 to inform detection of an effective coordinate, supplies coordinate data through a data bus, and accesses coordinate memory RAM 442 to store coordinate data different from previously input data. On the other hand, controller 443 supplies the coordinate detection signal from comparator 441 to CPU 451 in instruction analyzer 45 (FIG. 4) consisting of CPU 451 and program memory 452 so as to designate a write address for RAM 442. Therefore, when data of a write address to be designated in RAM 442 is sent back from CPU 451, controller 443 outputs the address designation signal through the address buffer and designates the corresponding write address of RAM 442. Since a request for designating the write address is thus completed, the coordinate detection signal is disabled and is no longer supplied from controller 443 to CPU 451. This operation is repeated to sequentially input and store updated coordinate data different from previous data into RAM 442.

When the coordinate detection signal is not generated from comparator 441 for a predetermined period of time, RAM 442 is started to be accessed by outputs from analyzer 45 through controller 443. Coordinate data analyzed by analyzer 45 is output and stored in comparator 441 in a FIFO (first-in first-out) manner through controller 443.

When an analysis operation is completed and an address data output from analyzer 45 to controller 443 is terminated, controller 443 supplies an output control signal to comparator 441, and coordinate data is transferred to RAM 442 until the stack becomes empty, i.e., the coordinate detection signal is disabled.

<OPERATION>

An operation of the embodiment of the electronic processor having the above arrangement used in the present invention and especially processing of analyzer 45 will be described below.

OVERALL PROCESSING (FIG. 5)

Figure 5:
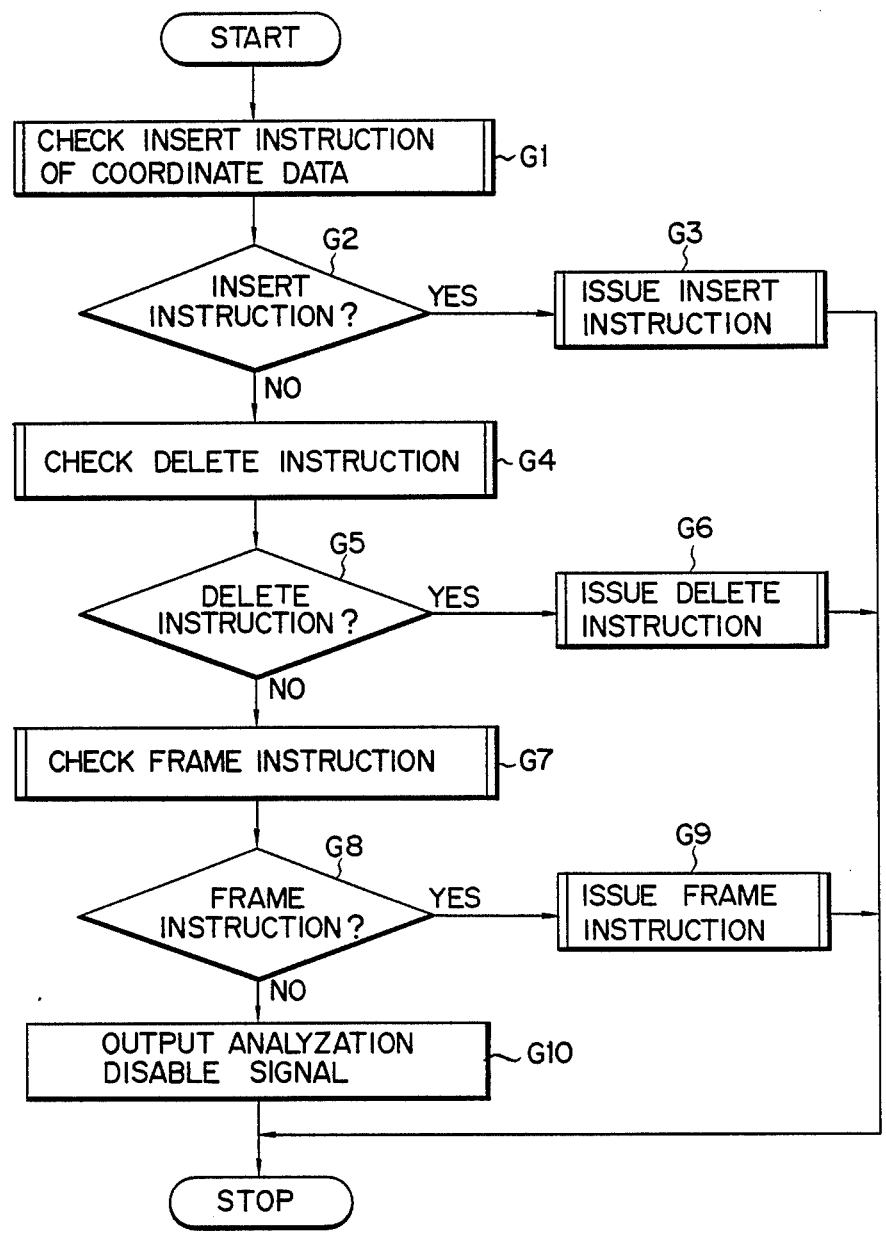
FIG. 5 is a main flow chart for explaining the operation of an embodiment of the present invention.

FIG. 5 shows a main flow executed by analyzer 45.

Steps G1, G2: Insert instruction identification steps for checking whether a set of input coordinate data is of insert instruction type.

Step G3: An output step executed in the case of an insert instruction, including a conversion step with respect to a text point.

Steps G4, G5: Delete instruction identification steps executed unlike in the case of an insert instruction, for checking whether an input coordinate data is of a delete instruction type.

Step G6: A step executed in the case of a delete instruction, including a conversion step with respect to the text point.

Steps G7, G8: Frame instruction identification step executed unlike in the case of a delete instruction, for checking whether the input coordinate data is of a frame instruction type.

Step G9: A step executed in the case of a frame instruction, including a conversion step with respect to the text point.

Step G10: A step executed when the set of input coordinate data is of no instruction type, for outputting an analyzation disable signal.

INSERT INSTRUCTION IDENTIFICATION STEP (FIG. 6)

Figure 6:
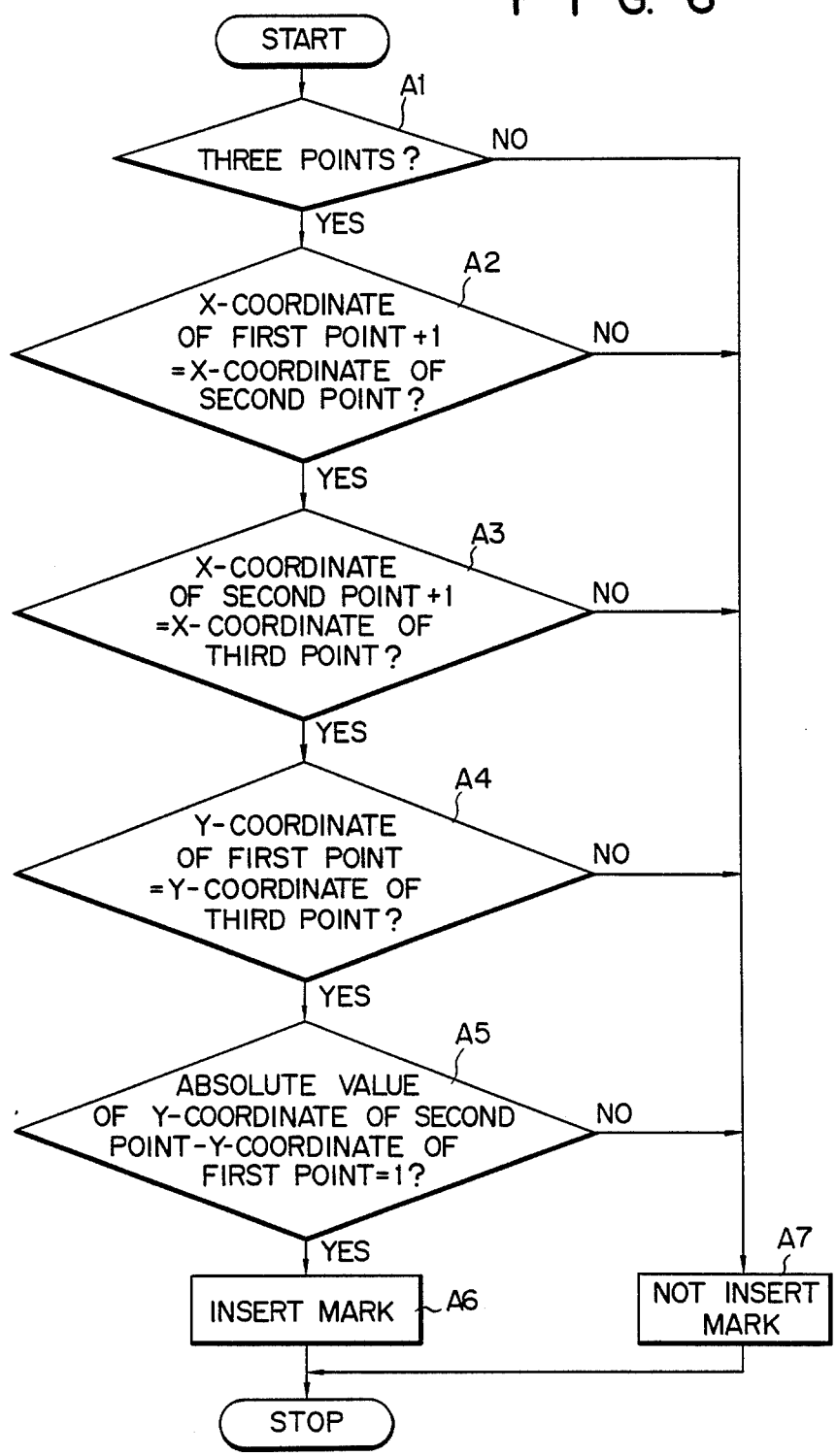
FIG. 6 is a flow chart for explaining insert-instruction identification processing, as another operation of the present invention.

FIG. 6 shows a flow chart of an insert instruction identification step.

In this embodiment, as shown in FIG. 1A, an insert instruction is identified when symbols such as "‿" and "⁀" are input.

Three points are required to constitute a symbol (step A1). An X-coordinate of a first text point is added to one to obtain the next X-coordinate (step A2), and the X-coordinate of a second point is offset to the right by one to obtain an X-coordinate of a third point (step A3). A Y-coordinate corresponding to the X-coordinate of the first point and a Y-coordinate corresponding to the X-coordinate of the third point are at the same height (step A4), and a difference between the Y-coordinate of the second point and the Y-coordinate of the first point is one (step A5). If all the conditions are satisfied, an insert symbol is identified (step A6).

Otherwise, the symbol is not identified as an insert symbol (step A7).

Note that the conditions for identifying the insert symbol is too strict, the conditions may be less strict. Changes in program required for this can be easily performed by those skilled in the art.

DELETE INSTRUCTION IDENTIFICATION STEP (FIG. 7)

Figure 7:
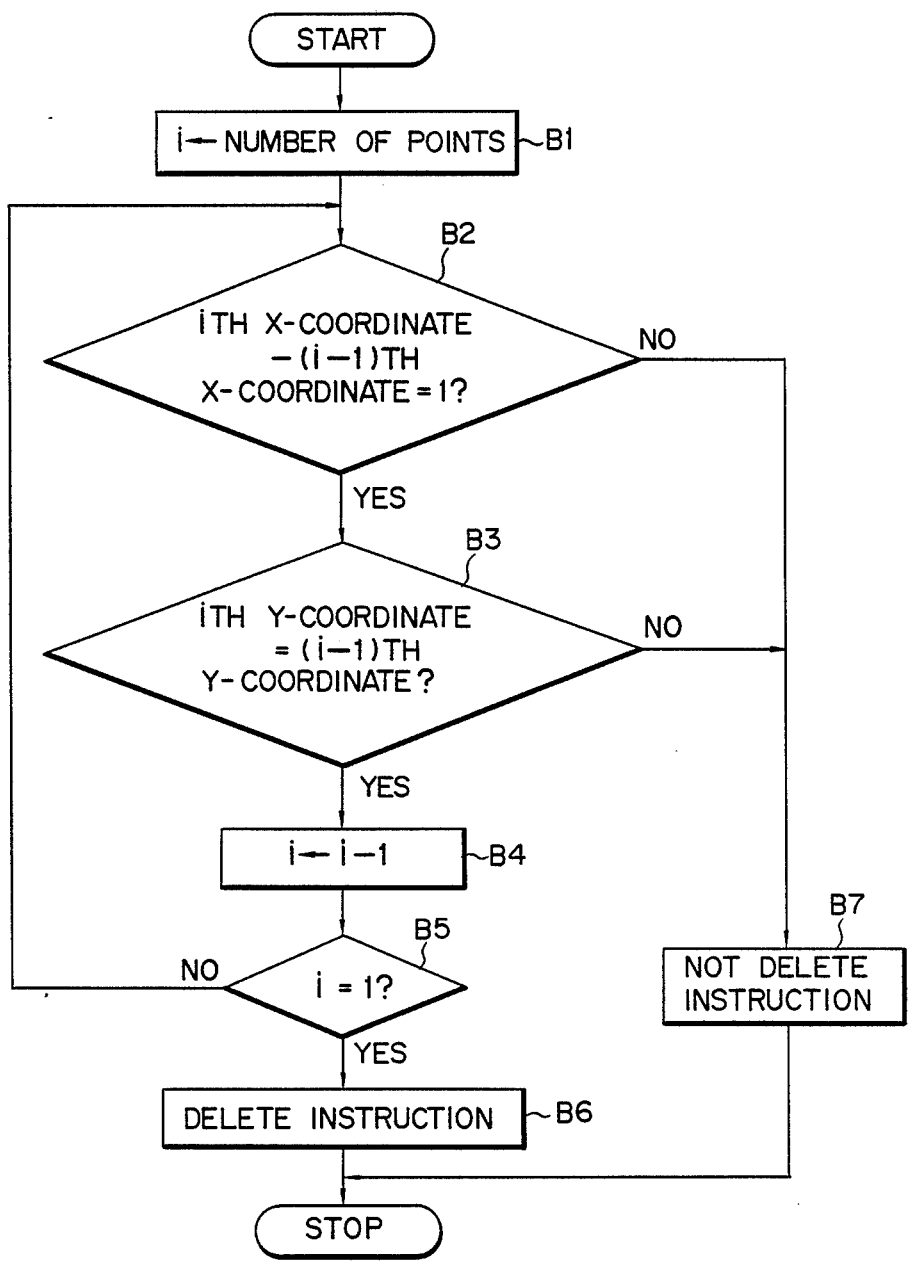
FIG. 7 is a flow chart for explaining delete-instruction identification processing, as yet another operation of the present invention.

FIG. 7 shows a flow chart of a delete instruction identification step.

As shown in FIG. 1B, a delete instruction is identified when a symbol such as "→" is input assuming that one line is deleted in a lateral writing format in this embodiment. Therefore, the conditions are such that for all the coordinate inputs, X- coordinates are shifted in the right one by one and all Y-coordinates are set at the same height.

A total number of points is obtained, and an initial value of variable i of the number representing the order of points is set (step B1). Assuming that pairs of coordinates are sequentially formed from an end point to a start point and the number representing a point near the end point is variable i, the following processing is performed (steps B2 to B7).

When an ith X-coordinate is located in the right of an (i−1)th X-coordinate at the left side thereof by one unit (one unit of the input mesh) (step B2), and when an ith Y-coordinate and an (i−1)th Y-coordinate are located at the same horizontal level (step B3), an ith point is determined to be located on a line to be deleted, and the coordinate number returns to previous coordinate number x(i−1) (step B4). The above steps are repeated until i=1 (step B5). A delete instruction is identified when all the points are located on the line to be deleted (step B6), and a delete instruction is not identified when even one point does not satisfy the above conditions (step B7).

Similar to the above example, a delete instruction may be identified by the less strict conditions. For example, if the start and end points satisfy the conditions of steps B2 and B3, the type of instruction is identified as a "delete instruction", or a reverse direction (right-to-left direction) is allowed.

FRAME INSTRUCTION IDENTIFICATION STEP (FIG. 8)

Figure 8:
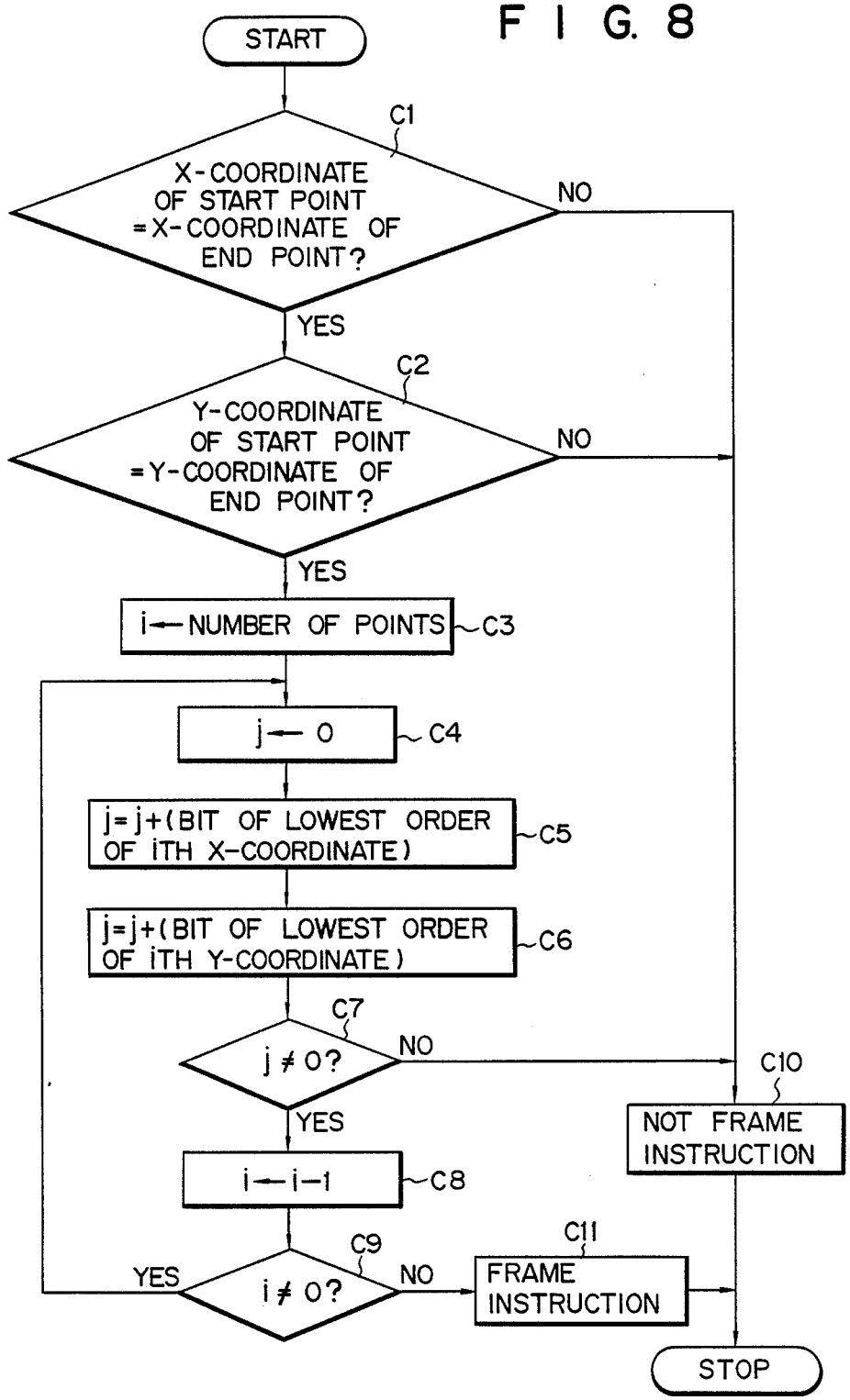
FIG. 8 is a flow chart for explaining frame-instruction identification processing, as still another operation of the present invention.

FIG. 8 shows a flow chart of a frame instruction identification step.

An example of a frame input is shown in FIG. 1C. In this example, a symbol input is obtained by the following array of (X,Y) points. That is, (1,1), (2,1), (3,1), (4,1), (5,1), (5,2), (5,3), (5,4), (5,5), (4,5), (3,5), (2,5), (1,5), (1,4), (1,3), (1,2), and (1,1). The set of points is characterized in that the start and end points are located at the same position and a line for a frame is drawn on a line obtained by connecting the points. In addition, in this example, assume that four squares of the input mesh (represented by numbers not encircled in FIGS. 1A, 1B, and 1C) correspond to one square of the output mesh (represented by encircled numbers, e.g., (①, ① ), (①, ② ), (②, ① ), and (②, ② )), and that an intersection of the output mesh (the center of a character in the square) coincides with only an intersection of a row point (Y-coordinate) and a column point (X-coordinate) both having even numbers of intersections on the input mesh. Therefore, it is checked that the start and end points coincide with each other in steps C1 and C2, and 16 points required for a frame as shown in FIG. 1C are set as i=16 in step C3. In step C4, 0 is inserted in another variable j. Then, in steps C5 and C6, a value of j is obtained by determining whether least significant bits of the X-coordinate and the Y-coordinate of the ith point are 0 or 1, and it is determined whether the obtained value of j is 0 in step C7. Assuming that the point at the center of the frame is input by a touch operation, X- and Y-coordinates of the point consist only of even numbers. If all the input points consist of only even numbers, it is determined not to satisfy i≠0, i.e., not to identify a frame instruction, and the input operation is stopped through step C10. On the other hand, if it is determined that j≠0 in step C7, a calculation in which 1 is subtracted from the ith point is performed in step C8, thereby obtaining new variable i. If a value of i is i≠0, the flow returns to step C4, and the input points are checked again. If i is not i=0, the frame instruction is determined in step C11.

ISSUE INSTRUCTION (FIGS. 9, 10, AND 11)

Figure 9:
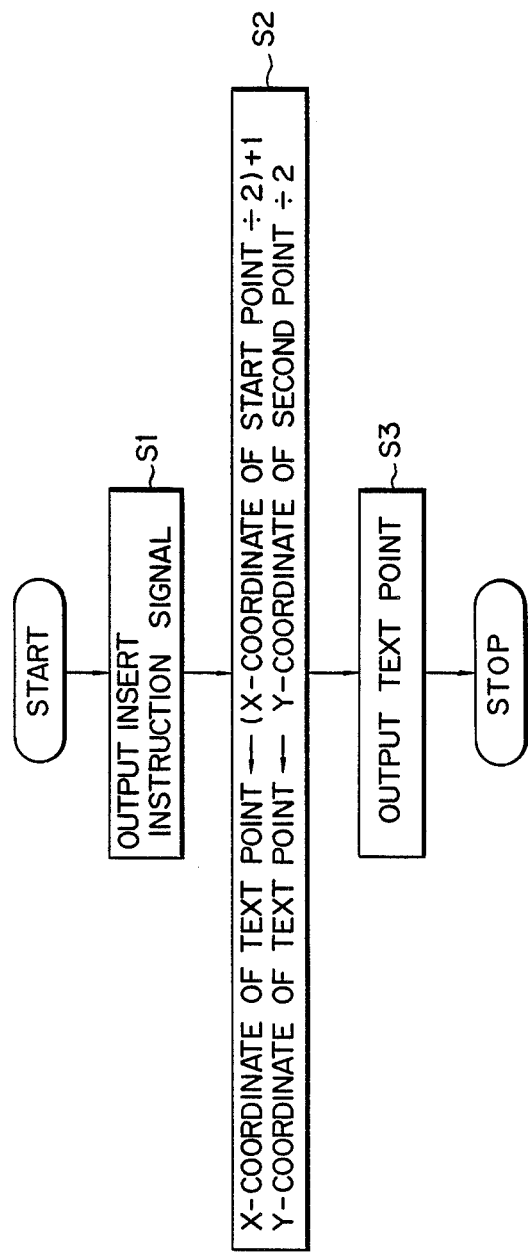
FIG. 9 is a flow chart for explaining insert-instruction issue, as still another operation of the present invention.

When the insert instruction is identified, the flow of FIG. 9 begins.

An insert instruction signal is supplied to circuit 46 to inform that the type of instruction is the "insert instruction" (step S1). An X-coordinate of the start point representing an insert position and a Y-coordinate of a second point are converted into X- and Y-coordinates of a text point and then supplied to circuit 46 (steps S2 and S3).

As described above, in this embodiment, input coordinates are defined using an input mesh similar to an output mesh relating to the text point. Therefore, in an area in which an instruction is to be executed, conversion from input mesh to output mesh systems can be easily performed (step S2 of FIG. 9; see FIG. 1).

Circuit 46, which receives the insert instruction signal and information of a text point to which the insert operation is performed, rearranges the text memory by a normal system and rewrites memory contents in the display memory (refresh memory) so as to execute the insert instruction.

Figure 11:
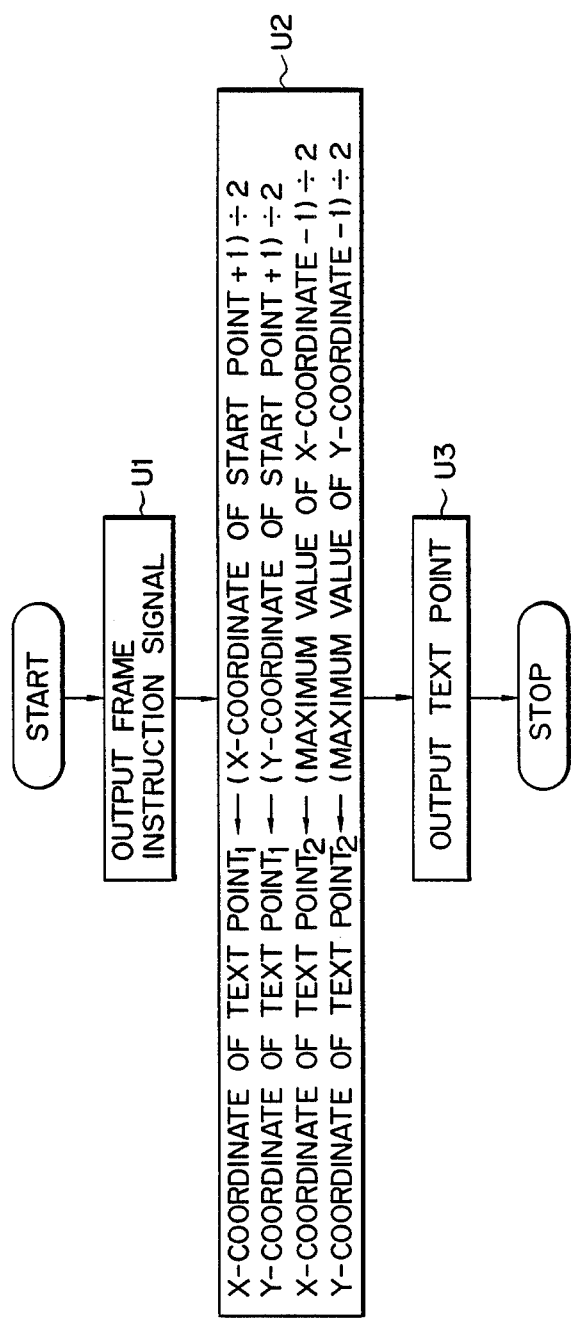
FIG. 11 is a flow chart for explaining frame-instruction issue, as still another operation of the present invention.

FIG. 10 shows a flow chart for issuing a delete instruction corresponding to step G6 of FIG. 5, and FIG. 11 shows a flow chart for issuing the frame instruction corresponding to step G9 of FIG. 5. Operations are apparent from descriptions in FIGS. 10 and 11, respectively, and a detailed description thereof will be omitted.

[MODIFICATIONS]

The present invention is not limited to the above embodiment, but may be variously modified or changed.

For example, in the above embodiment, a transparent input device having a touch operation surface on a display screen is used as an input means. During an interactive operation, operation inputs easily correspond to response results in this device, resulting in convenience.

However, a coordinate input device having a touch operation surface independently of a display screen, such as a tablet or a digitizer, may be used.

In addition, the present invention is applied to a wordprocessor in the above embodiment. However, the present invention may also be applied to an interactive graphic processor.

Furthermore, many kinds of symbol inputs with respect to the touch operation surface may be made in addition to those of the above embodiment, but not all of them can be described in this specification.

For example, in addition to a symbol of one stroke, a symbol of two or more strokes may be used.

More specifically, "◯" (this symbol means that a space or spacing between characters or lines is removed) "⊣[" (this symbol means that a character array or a symbol array is moved in a direction indicated by an arrow, i.e., to the left), and the like may be made.

Instruction analyzer 45 can be easily so modified as to correspond to symbol inputs of a plurality of strokes.

In addition, in the above embodiment, an input mesh relating to operation positions of the touch operation surface is similar to an execution mesh (text mesh in the above embodiment) relating to execution of instructions. This means that an area in which an instruction is to be executed can be immediately obtained without complex processing in accordance with input coordinates or coordinate groups. Therefore, response can be greatly improved, and the quantity of processing and a memory capacity can be greatly saved.

Scale conversion from the input mesh to the execution mesh need not be limited to one scheme. For example, when the present invention is applied to a word-processor capable of enlarging a multi-sized character font on a display screen, by performing communication between a wordprocessing circuit and an instruction analyzer to switch a scale conversion coefficient, scale conversion can be performed onto the execution mesh at the current time, and the current position, i.e., instruction execution area information can be defined on the execution mesh. This applies to a processor with a multi-window function having independent execution meshes in units of windows. Thus, an idea of a mesh can provide a great effect in association with symbol inputs. Since conversion is performed between meshes, geometric conversion (scale conversion, parallel conversion (offset), rotational conversion, and shearing) need only be performed to convert coordinates from the input mesh onto the execution mesh. In the simple case, only the scale conversion is required.

However, if a processor for executing instructions has no such idea of the execution mesh, processing of identification of an object to be processed (e.g., a graphic pattern to be deleted) and determination of a processing area (determination of a position of the graphic pattern to be deleted) is utilized in accordance with a position of a screen cursor, as in a certain interactive graphic processor. That is, a coordinate input position (a position on the input mesh) is replaced with a screen cursor position (a position of an image) in this processing, thereby executing the instruction.

Assume that a display is provided with an image memory (e.g., a refresh memory) for storing display data on a screen, a position memory for controlling and storing positions of graphic symbols (originally graphic patterns obtained from codes) included in display data on the screen, and a code memory for storing a code at a position represented by the position memory (i.e., a code of a graphic symbol displayed at this position). In addition, assume that an instruction analyzer analyzes a set of input points and obtains "replace" as the type of instruction. In this case, assume that the instruction analyzer admits the set of input points or a subset thereof, e.g., two points as a replacement range of the graphic symbols. Note that in this stage, the replacement range is defined on only the input mesh. Therefore, first, the replacement range is redefined on the screen, on the image, and on the position memory. Then the position memory is accessed to check whether a graphic symbol is present in this range. If the graphic symbol is present, a code of the symbol is found by referring to the code memory. Thus, all the positions of the graphic symbols to be replaced (two in this case) are found on the screen. In addition, all the codes of the graphic symbols to be replaced (two in this case) are found on the screen. Therefore, using these position information and code information, the image memory (refresh memory) is rewritten. That is, erase codes are used instead of the two found codes to erase two symbols from the image memory (refresh memory) in accordance with two pieces of found position information. Then, the two found codes are supplied to a memory such as a code/graphic pattern conversion memory or a conversion program and are converted into graphic symbols. A first converted symbol is written in the image memory using the position where a second symbol was located (this position has been found in previous processing). The second converted symbol is written in the image memory using a position where the first symbol was located (this position has been found in previous processing). Thus, two graphic symbols on the screen are replaced with each other.

What is claimed is:

1. An instruction input system for an electronic processor, comprising:
   touch input means having a transparent touch panel overlapped on a display means; and
   instruction-analyzing means coupled to said touch input means for simultaneously determining a type of an instruction of an area of said display means in which said instruction is to be executed, both said type of instruction and said area determined in accordance with a locus of operation positions selected by an operator on said transparent touch panel.

2. A system according to claim 1, wherein said display means includes a a display screen.

3. A system according to claim 2, wherein said touch input means comprises position-detecting means for receiving an operation position signal on said transparent touch panel, said position-detecting means being provided with means for producing the operation position in the form of intersection coordinates on a first mesh, defined by a plurality of straight lines parallel to an X direction, and a plurality of straight lines parallel to a Y direction.

4. A system according to claim 3, wherein said processor controls positions of graphic symbols and text characters which are displayed, on said display means, in squares on a second mesh defined by a plurality of straight lines parallel to the X direction, and a plurality of straight lines parallel to the Y direction.

5. A system according to claim 1, wherein said processor is an interactive processor having a graphic processing function.

6. A system according to claim 1, wherein said processor is an interactive processor having a text processing function.

7. A system according to claim 4, wherein said instruction-analyzing means determines the type of instruction in units of patterns, and determines the area in which the instruction is to be executed, in accordance with a position of a symbol on said transparent touch panel when the locus of operation positions input via said input means represents patterns of proofreader's symbols.

8. A system according to claim 1, wherein said instruction-analyzing means identifies a pattern of a symbol input by finger-activating said touch-operation surface of said input means, and determines the type of the instruction from said pattern.

9. An instruction input method for an electronic processor, comprising the steps of inputting an instruction using touch input means having a transparent touch panel overlapped on a display means, and simultaneously determining a type of said instruction and an area on said display means in which the instruction is to be executed in accordance with a locus of operation positions input on said transparent touch panel.

10. A method according to claim 9, wherein said processor is an interactive one having a text processing function, and when the locus of operation positions represents patterns of proofreader's symbols, said processor determines a type of the instruction in units of patterns, and determines the area of the display means in which the instruction is to be executed, in accordance with the locus of operation positions on said transparent touch panel.

11. An instruction input method for an electronic processor comprising the steps of:
   inputting at least one of a set of instructions by touching a locus of operation positions on a transparent touch panel overlapped on a display means,
   determining from said locus of operation positions the type of said at least one instruction input on the transparent touch panel, and
   simultaneously with determination of the type of instruction, determining from said locus of operation positions an area of the display means in which the at least one instruction is to be executed.

12. An instruction input system for an electronic processor, comprising:
   touch input means having a touch-operations surface; and
   instruction-analyzing means coupled to said touch input means for simultaneously determining a type of an instruction and an area in which said instruction is to be executed in accordance with a locus of operation positions selected by an operator on said touch-operation surface wherein said instruction-analyzing means identifies a pattern of a symbol input by finger-activating said touch-operation surface of said touch input means, and determines the type of the instruction from said pattern.

13. A system according to claim 12, wherein the symbol input includes at least one symbol of one stroke.

14. An instruction input system for an electronic processor, comprising:
   touch input means having a touch-operations surface on a display screen of a display means;
   instruction-analyzing means coupled to said touch input means for simultaneously determining a type of an instruction and an area in which said instruction is to be executed in accordance with a locus of operation positions selected by an operator on said touch-operation surface;
   wherein said touch input means comprises position-detecting means for receiving an operation position signal on said touch operations surface, said position-detecting means being provided with means for producing the input operation position in the form of intersection coordinates on a first mesh, defined by a plurality of straight lines parallel to an X direction, and a plurality of straight lines parallel to a Y direction which is orthogonal to said X direction; and wherein said processor controls positions of graphic symbols and text characters which are displayed, on said display means, in squares on a second mesh defined by a plurality of straight lines parallel to the X direction, and a plurality of straight lines parallel to the Y direction.

15. A system according to claim 14, wherein said instruction-analyzing means comprises means for converting the area in which the instruction is to be executed from an area on th first mesh, defined by said position detecting means, to an area on the second mesh, defined by said processor.

* * * * *